(No Model.) 2 Sheets—Sheet 2.
N. CORNISH.
BAND CUTTER AND FEEDER.
No. 551,432. Patented Dec. 17, 1895.
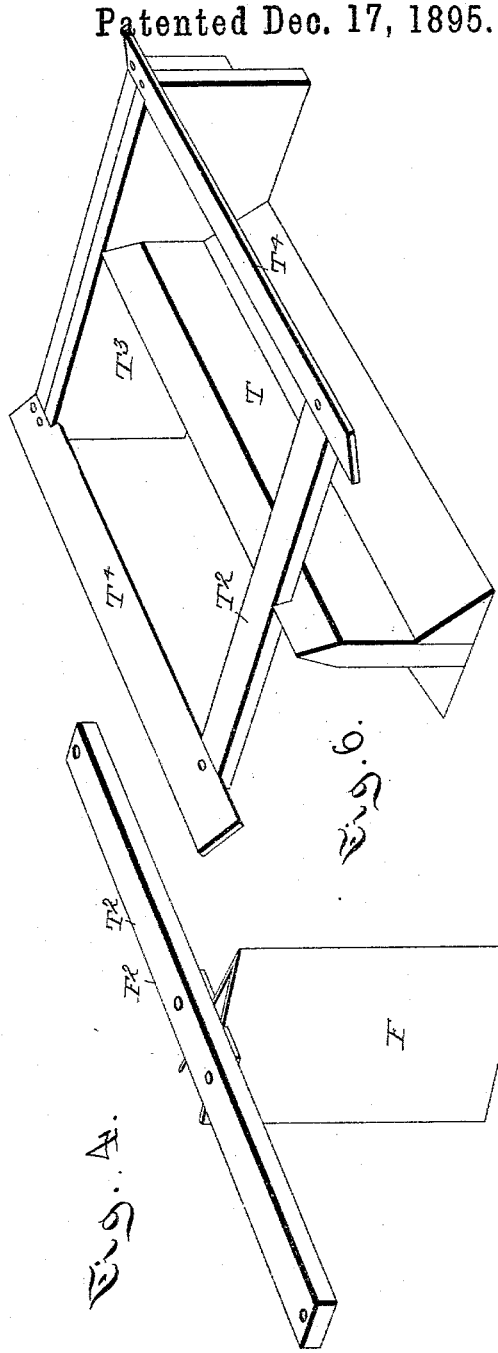
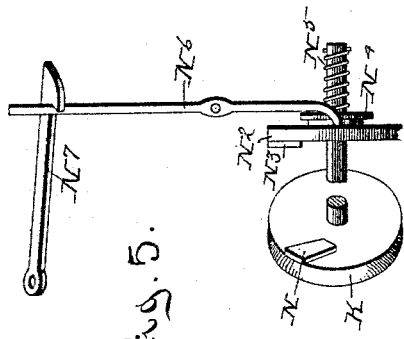
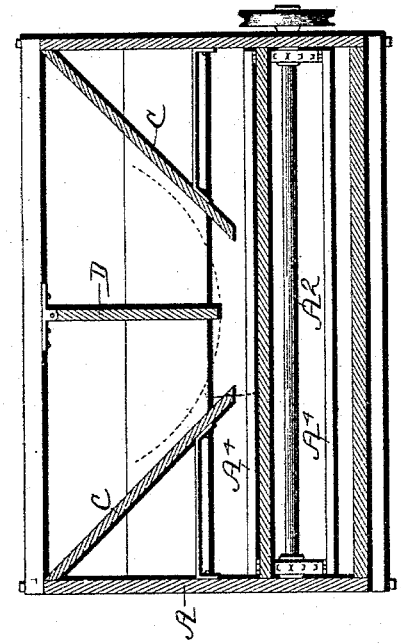
Witnesses:
W. J. Dankey.
R. G. Orwig.
Inventor: Nathan Cornish,
By Thomas G. and J. Ralph Orwig,
Attorneys.

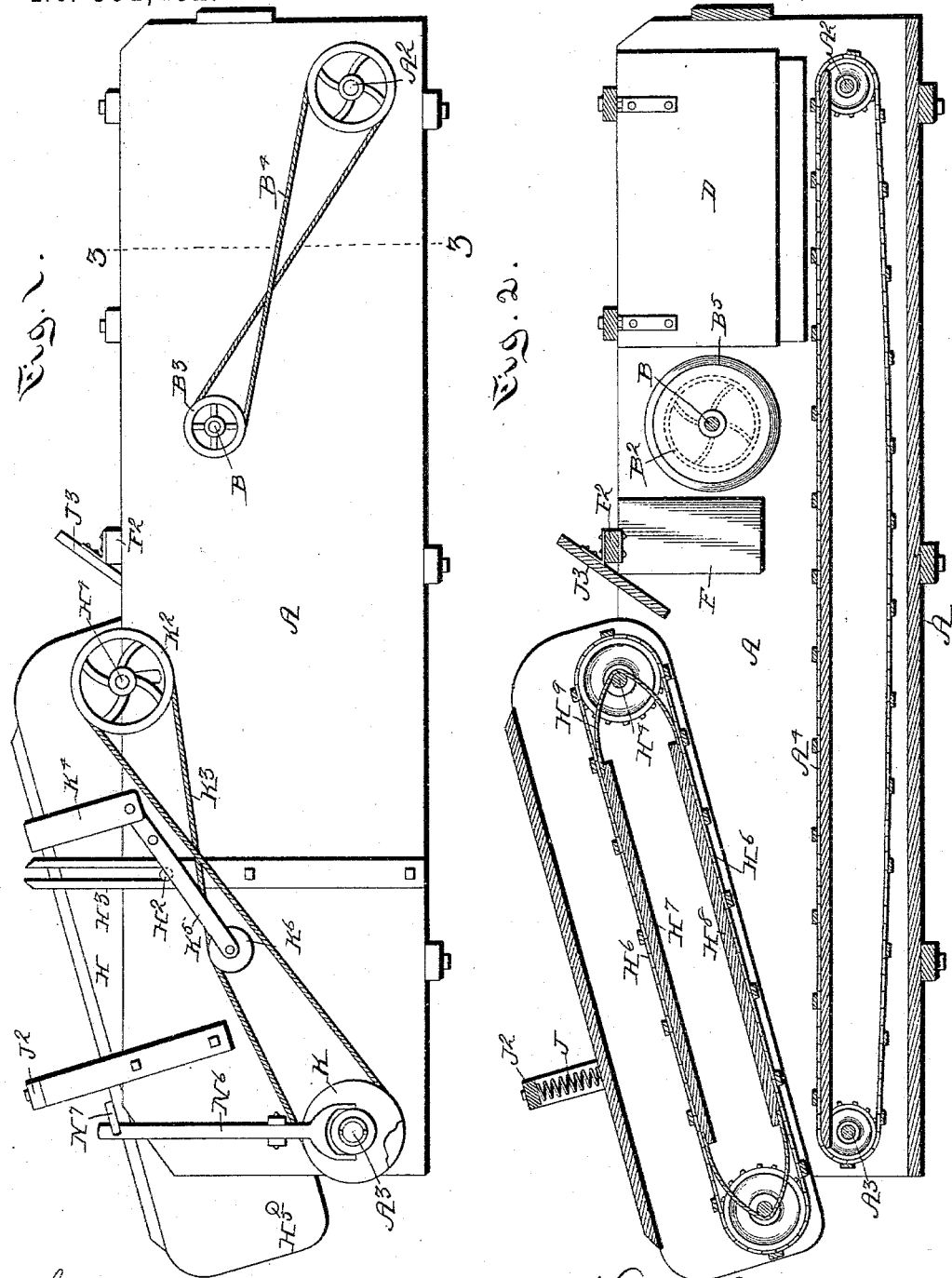

UNITED STATES PATENT OFFICE.

NATHAN CORNISH, OF GARNER, IOWA, ASSIGNOR TO WILLIAM O. McCANN, OF SAME PLACE.

BAND-CUTTER AND FEEDER.

SPECIFICATION forming part of Letters Patent No. 551,432, dated December 17, 1895.

Application filed March 16, 1895. Serial No. 541,968. (No model.)

*To all whom it may concern:*

Be it known that I, NATHAN CORNISH, a citizen of the United States of America, residing at Garner, in the county of Hancock and State of Iowa, have invented an Improved Automatic Band-Cutter and Feeder for Thrashers, of which the following is a specification.

The object of this invention is to provide an attachment for thrashing-machines that may readily be adapted to feed thrashers of different capacity or to feed grain in bundles or loose, and further to provide a simple, cheap and light-running feeder that will present the grain to the thrashing-cylinder in an even layer throughout the entire length of the cylinder to thereby prevent clogging and to increase the capacity of the feeder and cylinder.

My invention consists in the construction, arrangement and combination of the various parts of the device as hereinafter set forth, pointed out in my claim and illustrated in the accompanying drawings, in which—

Figure 1 is a side elevation of the complete machine. Fig. 2 is a vertical longitudinal sectional view of the same. Fig. 3 is a transverse sectional view of the device through the line 3 3 of Fig. 1. Fig. 4 is a perspective view of one of the spreaders detached. Fig. 5 is a detail perspective view of the mechanism for throwing the feeding machinery in or out of gear. Fig. 6 is a perspective view of the modified form of the bundle-receiving frame used when the band-cutting knives are employed.

Referring to the accompanying drawings, the reference letter A is used to indicate the frame of the machine adapted to be supported by any suitable means in a position to deliver grain to the cylinder of a thrashing-machine. Two shafts $A^2$ and $A^3$ are mounted in the opposite ends of this frame and a suitable endless conveyer $A^4$ passed over the shafts. This conveyer is operated by power derived from the thrashing-machine by means of a shaft B mounted in the frame of the self-feeder and having a belt-wheel $B^2$ to receive a belt from the thrasher.

$B^3$ is a pulley on the opposite end of the shaft connected with a pulley on the shaft $A^3$ by the belt $B^4$, and fixed to the said shaft B near its central portion is a circular band-cutting knife $B^5$.

The bundles or sheaves of grain are placed in the outer end of the carrier and are conveyed to the middle thereof so as to pass directly under the band-cutting knife by means of two inclined boards C at the sides of the frame. To prevent more than one bundle entering at a time, a swinging longitudinal partition D is placed over the central portion of the outer end. When a bundle is admitted from one side the swinging partition is forced outwardly toward the opposite side, thus preventing the admission of a bundle from said side until the first bundle has passed beyond the partition. Furthermore this partition and the guides cause the bundle to assume a position parallel with the carrier and thus pass straight under the band-cutting knife.

F indicates a spreader designed to separate the grain after the bands are severed, comprising a sheet-metal upright with a sharpened front edge and divergent side pieces supported above the endless conveyer $A^4$ and directly in the rear of the band-cutter by means of a cross-piece $F^2$, secured to the sides of the machine-frame.

H indicates a frame composed of parallel side pieces and a top piece pivotally supported by means of the laterally-extending journals $H^2$, placed in the slotted standards $H^3$. $H^4$ indicates a shaft in the forward lower corner of the frame and $H^5$ a like shaft in the rear lower corner. $H^6$ indicates an endless conveyer passed over said shafts and the platforms $H^7$ and $H^8$ are supported in position between the upper and lower portions of the endless conveyer. The space between said platforms is closed at the ends thereof by the sheet-metal guards $H^9$. This frame H is positioned directly over the rear end of the endless conveyer $A^4$ and inclined upwardly at its forward end, leaving the space between its rear end and the conveyer $A^4$ normally very contracted. This rear end is, however, permitted a slight vertical movement by reason of the springs J, fixed to the top of the frame H and in engagement with a cross-piece $J^2$ fixed to the machine-frame A. Thus the grain passing through between the two conveyers is pressed out flat or of an equal thickness throughout the entire width of the conveyers. The upper conveyer may, however, yield slightly to admit a greater quantity of grain, and, further, the grain is aided to advance by both the upper and under conveyer, thus economizing power. $J^3$ indicates a guide to direct the straw under the upper conveyer and prevent it from piling up on top of the said upper conveyer. It is supported by the side pieces of the frame A.

The upper conveyer is arranged to be operated by means of a belt-wheel K, loosely mounted on the shaft $A^3$, connected with a belt-wheel $K^2$, fixed to the forward shaft of the upper conveyer, by a crossed belt $K^3$. Means are provided for automatically adjusting the tension of the belt as the forward end of the upper conveyer is raised or lowered by the grain, as follows:

$K^4$ indicates an arm fixed to the forward end portion of the upper conveyer-frame and overlapping the side of the frame A.

$K^5$ indicates a lever fulcrumed to the side of the frame A and having a pulley $K^6$ on its one end and its other end pivoted to the arm $K^4$. This pulley is so disposed as to engage the belt $K^3$. When the rear end of the upper conveyer-frame is elevated the forward end of the frame will be lowered, thus bringing the two belt-wheels more nearly in the same plane and thereby loosening the belt. The pulley $K^6$ is, however, by this movement correspondingly raised and the belt thereby tightened proportionately.

For throwing the upper conveyer in or out of gear, I have provided a lug N on the outer surface of the belt-wheel K, a disk $N^2$ slidingly mounted on the shaft $A^3$ and provided with a lug $N^3$ to engage the lug N. This disk is provided with an annularly-grooved hub $N^4$ and is normally held in engagement with the pulley K by means of an extensile coil-spring $N^5$.

$N^6$ indicates a lever pivoted to the side of the frame A and having a forked lower end admitted into the grooved hub $N^4$. A latch $N^7$ provides means for holding the end of the lever inwardly and the disk and belt-wheel separated.

When it is desired to use the machine on thrashers of greater capacity, the swinging partition in the forward end of the frame A is removed and the device shown in Fig. 6 inserted in its place. This device comprises a fixed central partition T with outwardly-inclined boards at its bottom, a cross-piece $T^2$ at its top, an end piece $T^3$, and two parallel side pieces $T^4$, inclined inwardly and adapted to rest upon the side pieces of the frame A and support the device above the conveyer. Bundles of grain are admitted from each side at the same time and with this device two cutting-knives and also two spreaders are used, positioned to engage each row of bundles.

In the practical operation of the device when the form shown in Fig. 3 is used it is obvious that bundles of grain may be fed from either or both sides and the bundles pass one by one in a longitudinal position to the central portion of the endless conveyer. This bundle will be first engaged by the cutting-disk and the band severed. Then the stationary spreader will distribute the bundle somewhat, and upon entering between the two conveyers the grain will be forced to distribute evenly over the surface of the conveyer and be fed to the cylinder in a layer of uniform thickness. It is obvious further that the feeding mechanism cannot become clogged with wet or tangled grain. Furthermore the operator has perfect control over the operation of the upper conveyer and the belt for operating said conveyer is always maintained at a given tension. The machine may be readily adapted for thrashers of different capacities by substituting one bundle-guiding device for another, or if loose grain is fed the guides may be dispensed with entirely.

Having thus described my invention, what I claim as new therein, and desire to secure by Letters Patent of the United States therefor, is—

In an improved self feeder for thrashing machines, the combination of a suitable platform, an endless conveyer arranged to travel longitudinally thereof, a second platform above the end of the first inclined so that the outer ends of the two converge, an endless carrier passing around said platform, a belt wheel loosely mounted on the shaft of the endless conveyer on the lower frame, means for throwing said wheel in and out of gear with the shaft, a belt wheel on the upper shaft of the top conveyer, a crossed belt connecting the two, an arm fixed to the top frame, a lever fulcrumed to the lower frame and pivoted to the arm and a pulley on the opposite end in engagement with said belt, substantially as and for the purposes stated.

NATHAN CORNISH.

Witnesses:
J. E. WICHMAN,
EUGENE CORNISH.